United States Patent [19]

Kielb

[11] 4,095,631
[45] Jun. 20, 1978

[54] HOLDING ARM

[75] Inventor: Eugene James Kielb, Spokane, Wash.

[73] Assignee: Clark Equipment Company, Buchanan, Mich.

[21] Appl. No.: 767,426

[22] Filed: Feb. 10, 1977

[51] Int. Cl.² .................................... A01G 23/08
[52] U.S. Cl. ............................. 144/34 E; 144/3 D
[58] Field of Search ............... 294/106; 144/2 Z, 3 D, 144/34 R, 34 E, 309 AC

[56] References Cited

U.S. PATENT DOCUMENTS

| | | | |
|---|---|---|---|
| 3,749,143 | 7/1973 | Hamilton | 144/3 D |
| 3,805,860 | 4/1974 | Smith | 144/3 D |
| 3,875,983 | 4/1975 | Kurelek | 144/3 D |
| 3,886,985 | 6/1975 | Iarocci et al. | 144/3 D |
| 3,910,326 | 10/1975 | Tucek | 144/3 D |
| 3,911,981 | 10/1975 | Tucek | 144/3 D |

*Primary Examiner*—Othell M. Simpson
*Assistant Examiner*—W. D. Bray
*Attorney, Agent, or Firm*—Harry G. Thibault

[57] ABSTRACT

An accumulating mechanism is provided for use in conjunction with a shear mechanism used in forestry applications. A tree harvesting apparatus employs a shear mechanism to cut the trees, a grapple mechanism to hold the trees while they are being cut, and an accumulator mechanism to accumulate several trees before depositing a load thereof. The accumulator mechanism of the present invention comprises an elongated base portion having a forward edge thereof aligned with a rear edge of the shear blade as well as the rear edge of the grapple mechanism. Pivotally mounted on the base portion of the accumulator mechanism is a holding arm which is pivoted forwardly to grasp cut trees and hold them in place as the harvesting machine moves from place to place to cut subsequent trees. The holding arm has a curved inner surface and is engageable with a forward projection of the accumulator base to retain trees in the space provided therebetween. The outer surface of the holding arm is concentric with the pivot axis of the accumulator mechanism to readily enable the holding arm to be extracted from between a newly cut tree and the group of trees already accumulated. The arm is then closed to encompass both the newly cut tree and the trees already accumulated. A hydraulic cylinder is disposed between the base of the accumulator mechanism and the holding arm to extend and retract the holding arm during the accumulation process.

5 Claims, 4 Drawing Figures

HOLDING ARM

BACKGROUND OF THE INVENTION

1. Field of the Invention:

Construction equipment such as front end loaders can be adapted to forestry operations such as tree harvesting by the provision of a shearing head or shear mechanism at a forward end thereof. The shear mechanism comprises power driven means for readily cutting and felling a tree in logging operations. The shear mechanism normally employs a pair of cutting blades which can be activated by one or more hydraulic cylinders to draw the blades together and shear off the tree. The shear mechanism is generally provided at the base portion of a supporting column which carries the power means for driving the shear blade and generally provides a grapple mechanism in spaced relation from the shear mechanism, the grapple mechanism being employed to hold the tree in abutting relation with the supporting column while the tree is being cut by the shear mechanism. Although the shear and grapple combination substantially improves the operating efficiency of a logging operation and permits discrete placement of felled trees, it is desirable to provide the harvesting machine with the capability to accumulate trees as they are being cut. This is particularly true in the pulp and paper industry where the vast majority of trees cut are of relatively small diameter and the initial logging process can be substantially accelerated if the machine has the capability to gather trees thereon as they are being cut to be later deposited in a central pick up area. To this end a number of accumulator mechanisms have been employed.

2. History of the Prior Art

Typical of the prior art is the U.S. Pat. No. 3,805,860 — Smith, entitled "Apparatus for Severing and Grouping Trees" wherein a gathering finger is employed in conjunction with a shear and accumulating mechanism to accumulate sheared trees. The mechanism employs articulated gripping finger parts which form an articulated holding finger for holding severed trees while a successive tree to be severed and grouped therewith is held against the holding finger. Separate withdrawing forces requiring two powered means are applied to the finger parts to "snake" the parts out to a removed position permitting the trees to be grouped. The grouped trees can then be deposited on the ground in position to be picked up by other equipment.

The above patent is typical of a group of prior art which requires that the gathering arm of the accumulator be articulated or jointed at some intermediate portion thereof so as to enable the arm to be removed from between the last cut tree and the group of trees already accumulated in order to gather the freshly cut tree into the group of accumulated trees. The present invention disposes of multiple power means to perform the so-called "snaking" motion and further provides a uniform accumulator arm having an involute outer surface which permits the arm to be readily withdrawn from between the accumulted trees and the newly cut tree and to be returned to place, bunching all trees, such involute arm not requiring an intermediate movable section.

The advantages of such an accumulator arm are obvious. Multiple power sources operating the arm are eliminated, pivotal joints required in the arm are eliminated and the accumulating function becomes greatly simplified.

Other objects and advantages of the present invention will become apparent as the description thereof proceeds.

SUMMARY OF THE INVENTION

A tree harvesting apparatus is removably mounted on a logging vehicle to provide a machine for severing trees and gathering the severed trees. The apparatus comprises a supporting column carrying a tree shear mechanism at the base of the column for severing a tree, a tree gripping means mounted at a central portion of the column for gripping trees to be severed by the tree shear mechanism and an accumulator mechanism mounted atop the column for retaining cut trees in vertical disposition on the apparatus. The accumulator grips the cut trees while the machine seeks out a successive tree to be severed and grouped therewith. Each successive tree is held by the tree gripping means in abutting relationship with an outer edge of the holding arm. After the tree is cut by the shear, the grapple retains the tree while the holding arm is pivoted outwardly to withdraw the arm from between the cut tree and the accumulated trees. The holding arm is thereafter closed in place to grip all of the cut trees.

DESCRIPTION OF THE DRAWINGS

The present invention may be more readily understood if considered in conjunction with the accompanying drawings in which.

Detailed Description

Figure 1:
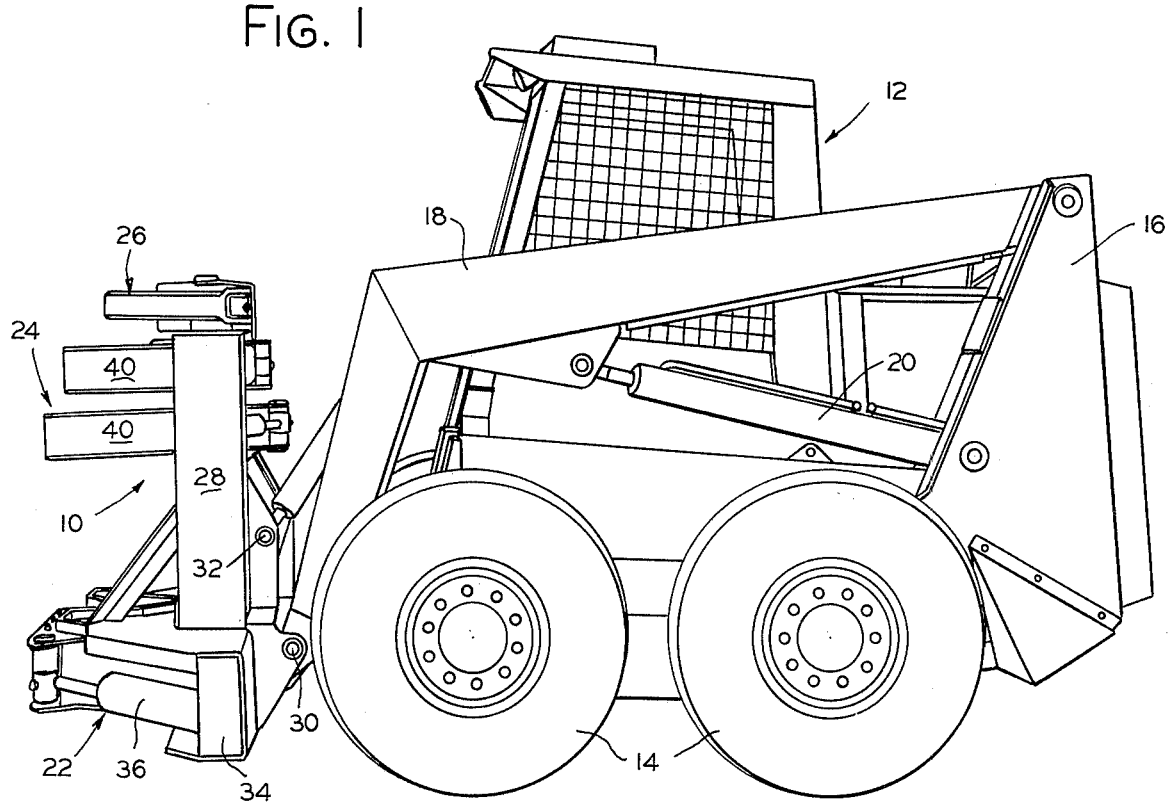
FIG. 1 is a side elevational view of a logging vehicle having mounted at a forward end thereof a tree harvesting apparatus comprising a grapple means, a tree shear apparatus and the accumulator mechanism of the present invention.

FIG. 1 shows a preferred embodiment of the present invention mounted on a tree harvesting apparatus 10, the apparatus 10 mounted at a forward end of a logging vehicle 12. The vehicle 12 shown in FIG. 1 comprises a skid-steered vehicle having independently driven sets of wheels 14, rear uprights 16 and opposite boom lift arms 18. The boom arms 18 are raised and lowered by respective opposite hydraulic cylinders 20 having opposite ends connected between the rear upright 16 and the lift arm 18. Mounted at the lower end of the boom arms 18 is the tree harvesting apparatus 10 comprising a tree shear 22, a grapple structure 24 and the particular embodiment of the present invention, an accumulator mechanism 26.

Figure 2:
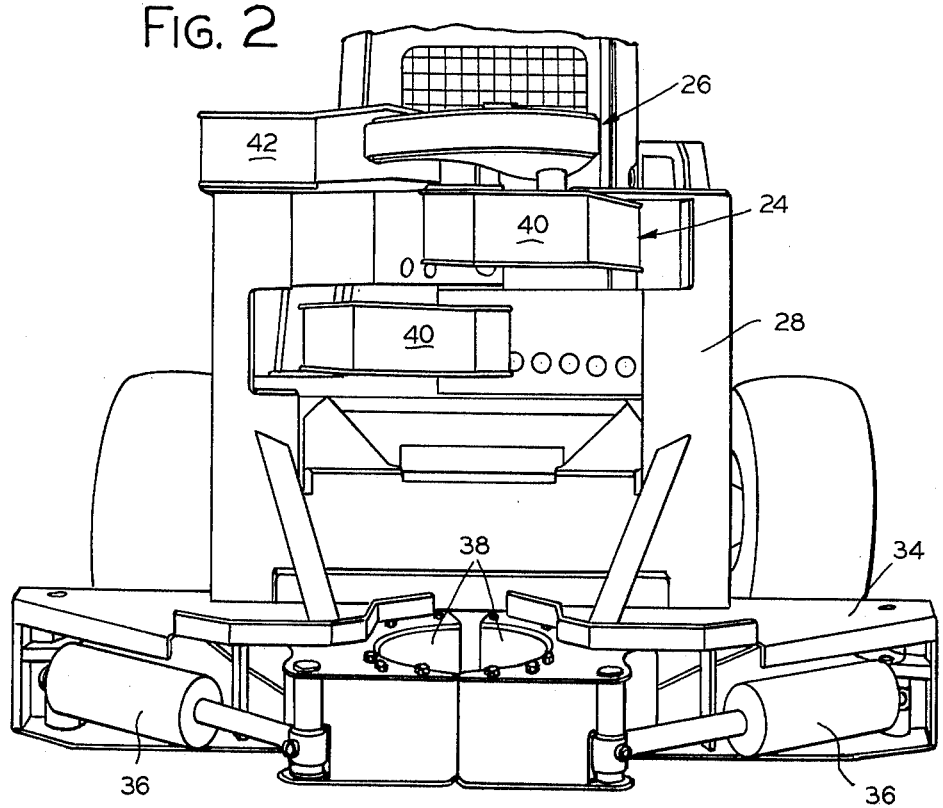
FIG. 2 is a front elevational view of the tree harvesting machine shown in FIG. 2 wherein the accumulator mechanism of the present invention is disposed at an upper portion thereof.
Figure 3:
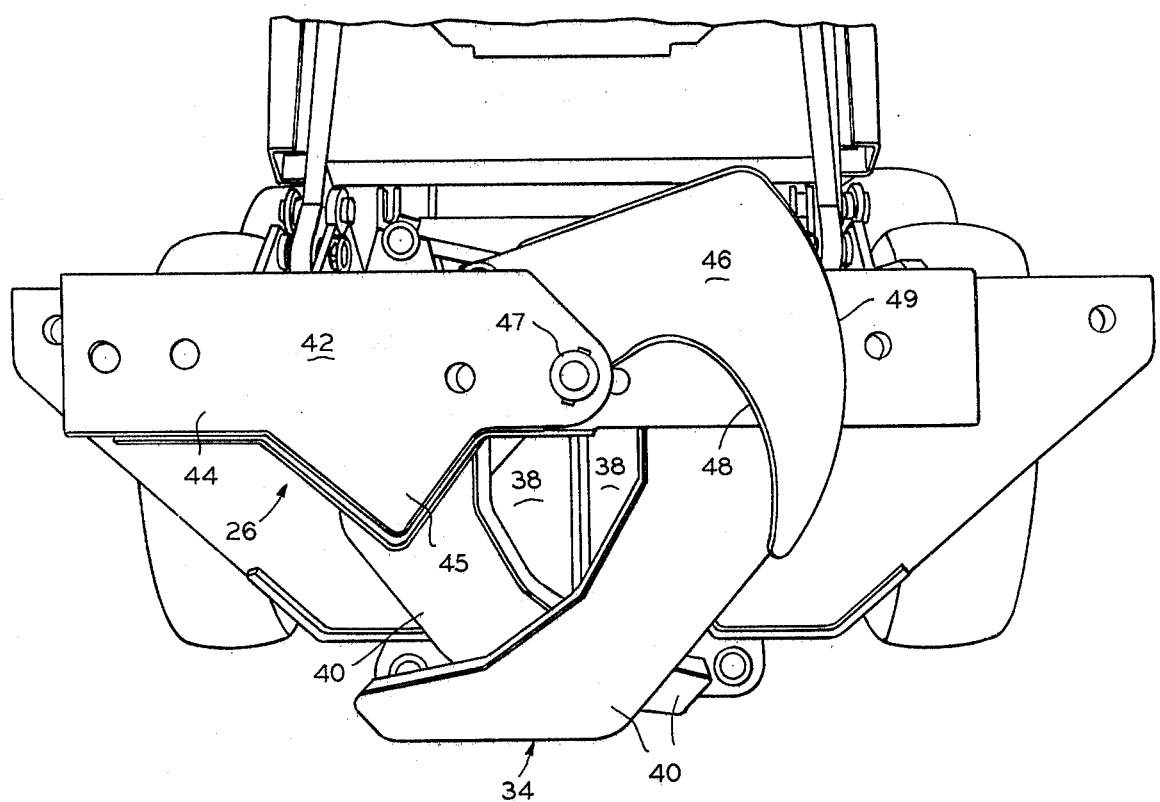
FIG. 3 is a top plan view of the tree shearing apparatus with the accumulator mechanism of the present invention overlying such apparatus.
Figure 4:
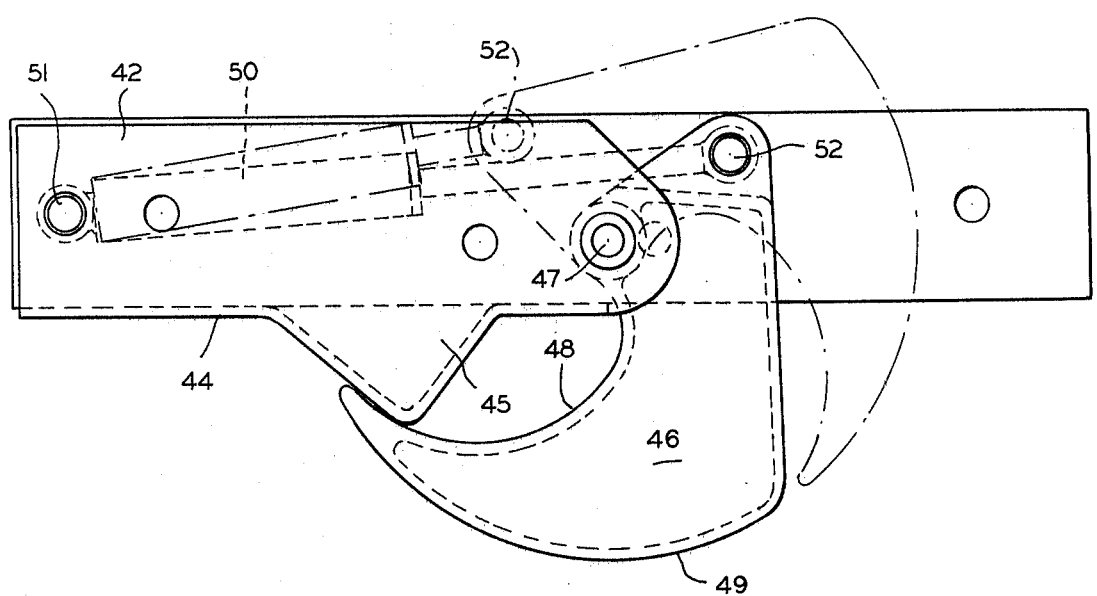
FIG. 4 is a schematic view of the accumulator mechanism similar to the view shown in FIG. 3, with the mechanism shown in the closed position in solid lines and in the retracted position in broken lines.

The mechanisms 22, 24 and 26 are mounted on a support structure 28 pivotally connected to the boom 18 as at points 30 and 32. The tree shearing apparatus 22 is mounted at a lower end of the support structure 28 and includes a frame 34 extending laterally outwardly from the support structure 28 and having mounted therein hydraulic cylinders 36 on opposite sides thereof driving shear blades 38 reciprocally. A hydraulically actuated grapple mechanism 24 includes grapple arms 40. The accumulator mechanism 26 includes a base portion 42 mounted on the left side of the support structure 28 as viewed in FIGS. 2 and 3. The base structure 42 is laterally aligned on the support structure 28 and has a forward edge 44 which is generally aligned with the rear peripheral edges of the shear mechanism 22 and the grapple mechanism 24. A projection 45 extends forwardly of the base portion 42 as shown in FIGS. 3 and 4. The inner end of the accumulator mechanism 26 generally overlies the center portion of the support structure 28 and is generally aligned with the linear axis of the closed blades of the shear mechanism 22. A holding arm 46 associated with the accumulator mechanism 42 is mounted on a pivotal connection 47 overlying the axis through the intersection of the shear blades 38. The holding arm 46 includes a curved inner surface 48 and an involute outer surface 49 concentric with the axis of the pivotal connection 47 of the accumulator assembly 26. A hydraulic cylinder 50 (FIG. 4) is pivotally mounted as at 51 on the base portion 42 of the mechanism 26 and on the holding arm 46 at pivot point 52. The hydraulic cylinder 50 can be extended to urge the holding arm toward the projection 45 on the base portion 42 as shown in solid lines in FIG. 4 and can be retracted to the fully retracted position shown in FIG. 3 and in FIG. 4 (dotted lines).

OPERATION OF THE PREFERRED EMBODIMENT

The accumulator mechanism can be operated to grip a plurality of trees as follows. The accumulator mechanism 26 may grip a single tree in the fully closed position shown in FIG. 4 or a plurality of trees in a position intermediate to the fully closed position of FIG. 4 and the fully retracted position of FIG. 3. With the holding arm 46 in a closed position gripping a plurality of trees (not shown) in the harvesting apparatus 10 the shear mechanism 22 may be deenergized to dispose the shear blades 38 in an open position prior to cutting a subsequent tree. The grapple mechanism 24 is open to receive a non-severed tree, and the holding arm 46 of the accumulator mechanism 26 is closed on a plurality of cut and gathered trees. The support structure 28 is then aligned with an upright uncut tree (not shown), such tree abutting the outer involute edge 49 of the holding arm 46. The grapple arms 40 are closed about the unsevered tree and the shearing mechanism 22 actuates the hydraulic cylinders 36 to drive the shear blades 38 together and cut the tree. After the tree is cut the grapple arms 40 remain in intimate contact therewith and the holding arm 46 is extricated from between the newly cut tree and the already accumulated trees. The removal of the accumulator arm 46 from between the outermost cut tree and the accumulated trees is readily effected when the cylinder 50 is retracted because of the involute outer surface 49 of the holding arm 46. With the holding arm 46 removed from the group of accumulated trees the newly cut tree is added to the plurality of accumulated trees and the hydraulic cylinder 50 is again extended to close the holding arm 46 and grip the accumulated trees once more. With the holding arm 46 closed in place the grapple mechanism 24 may be reopened and, of course, the shear mechanism 22 may be opened to cut and accumulate another tree. When a sufficient number of cut trees have been accumulated the vehicle 12 may transport such trees to a designated location for deposit.

The invention thus described provides a means for collecting a plurality of cut trees to be deposited at a central location once a sufficient number of trees have been accumulated, such means providing a substantial advantage over a tree shearing apparatus which would permit only a single tree to be deposited at a time. Having described such invention in detail as set forth above it should be obvious to those skilled in the art that modifications may be made in the details of construction without departing from the invention which is to be limited only by the scope of the appended claims.

I claim:

1. For use in conjunction with a tree harvesting apparatus comprising a tree shear mechanism and a grapple mechanism, a mechanism for accumulating cut trees, the accumulator mechanism cooperable with the grapple mechanism for gathering cut trees, the accumulator mechanism comprising a base portion mountable on the tree harvesting apparatus, a power arm for gripping the accumulated trees, the power arm comprising a curved member having an inner end pivotably mounted on the base portion of the accumulator mechanism, the curved member having a curved inner surface to receive the cut trees and a curved outer surface concentric with the pivot axis of the accumulator mechanism to facilitate disengagement of the curved member from between a newly cut tree held by the grapple mechanism and the accumulated trees cooperatively engaged by the grapple mechanism and the accumulator mechanism, the pivot axis of the power arm being generally aligned with the longitudinal axis of the tree to be cut, power means pivotally connected between the base portion of the accumulator mechanism and the inner end of the curved member of the power arm, the pivotal connection for the power means of the curved member being laterally disposed from the pivot axis of the power arm at the inner end of the curved member, the power means cooperating with the curved member for opening and closing the power arm to gather cut trees in cooperation with the grapple mechanism, and an abutment means provided at the forward end of the base portion of the accumulator mechanism coopertively engaging the curved outer end of the power arm to retain the cut trees in a space provided therebetween.

2. An accumulator mechanism as claimed in claim 1, wherein the tree harvesting apparatus includes a tree shear mechanism having opposing blades reciprocally operated to sever a tree, the pivot axis of the power arm being generally aligned with the intersection of the blades of the shear mechanism.

3. An accumulator mechanism as claimed in claim 2 wherein the forward longitudinal edge of the accumulator base is generally aligned with the rear edge portion of the tree shear mechanism.

4. The accumulator mechanism is claimed in claim 1, where the abutment means comprises a forward projection of the front longitudinal edge of the accumulator base, the power arm engaging the projection when the arm is closed to secure the cut trees.

5. An accumulator mechanism provided on a tree harvesting apparatus, said accumulator mechanism being mounted on the tree havesting apparatus in vertical spaced relation with a tree shear mechanism, the tree harvesting apparatus including a grapple assembly for holding a tree while it is being cut, the accumulator mechanism being cooperable with the grapple assembly for gathering cut trees, the accumulator mechanism comrpising a base portion vertically spaced with respect to the shear mechanism and the grapple assembly, the base portion having a frontal edge generally aligned with the rear edge of the shear mechanism and the grapple assembly, a power arm comprising a curved member having an inner end pivotally mounted on the base portion of the accumulator mechanism, the curved member having a curved inner surface to receive the cut trees and an involute outer surface concentric with the pivot axis of the accumulator mechanism to facilitate disengagement of the curved member from between a freshly cut tree and the accumulated trees cooperatively engaged by the grapple mechanism and the accumulator mechanism, and power means provided between the base portion of the accumulator mechanism and the inner end of the curved member of the power arm, said power means engageable to rotate the power arm about a pivot axis provided on the base portion of the accumulator mechanism to carry the curved outer end of the power arm into engagement with a forward projection of the base portion of the accumulator mechanism to retain accumulated trees in a space provided therebetween.

* * * * *